United States Patent Office 2,879,283
Patented Mar. 24, 1959

2,879,283

SULFOALKYL PHOSPHOROTHIOATES AND METAL SALTS THEREOF

Van R. Gaertner and Gail H. Birum, Dayton, Ohio, assignors to Monsanto Chemical Company, St. Louis, Mo., a corporation of Delaware No Drawing. Application June 6, 1955
Serial No. 513,581

12 Claims. (Cl. 260—461)

This invention relates to the reaction of alkanesultones with phosphorothioic acid compounds and to the products derived therefrom.

The compounds provided by the present invention may be represented by the general formula

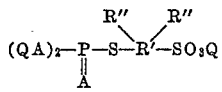

where Q is selected from the class consisting of hydrogen, metallic cations, and ester-forming radicals, A is a chalcogen element selected from the class consisting of oxygen and sulfur, R' is an alkyl hydrocarbon radical containing from 3 to 7 carbon atoms, and R" is selected from the class consisting of hydrogen and alkyl radicals of from 1 to 12 carbon atoms.

Sulfonated phosphates have been known previously. However, the art has not hitherto disclosed any method for making individual well-characterized compounds of the present type, containing both a phosphoric and a sulfonic acid functional group, and a phosphorus-to-sulfur bond, although the value of this type of compound, e.g., as detergent additives for lubricating oils, has been demonstrated by several proposals in the art for synthesis of related compounds. For example, the reaction products of alkyl sulfonates and phosphorus-sulfur compounds (such as phosphorus pentasulfide) are claimed in U.S. 2,528,257, U.S. 2,483,270 and U.S. 2,451,346. These, however, are products of indeterminate structure, defined by their process of manufacture. The art also proposes (U.S. 2,694,084) to sulfonate dialkyl dithiophosphates, but this patent indicates that the sulfonate group in the product again occupies an indeterminate position.

By the present invention, there are provided well-defined phosphinothioylthio- and phosphinylthioalkanesulfonic acid compounds, by the reaction of an alkanesultone with a phosphorothioic acid compound, which may be represented schematically by the following equation:

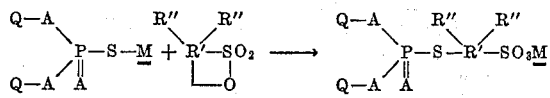

where Q, A, R' and R" are as defined above, and M is a metallic cation. The reaction product of the above formula may be further reacted, as described hereinbelow, to hydrolyze the sulfonate salt to the free sulfonic acid group, or to introduce an ester group on the sulfonic acid radical, whereby means are provided for producing any of the products of the general formula for the new compounds covered by the present invention as shown further above.

The alkanesultones of the above formula, suitable for use in the present reaction, may be prepared, e.g., by sulfochlorination of an organic halide, hydrolysis of the sulfonyl halide thereby formed, and ring-closure of the hydrolysis product with evolution of hydrogen halide. Sultones may be named as derivatives of the corresponding hydroxy sulfonic acids, i.e.:

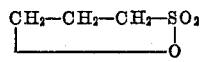

Sultone of 3-hydroxy-1-propanesulfonic acid

The products of the sulfochlorination process of synthesizing sultones, as described above, are usually a mixture of isomers, e.g., starting from butyl chloride, there may be produced:

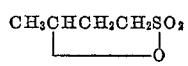 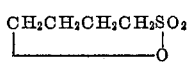

Sultone of 3-hydroxy-1-butanesulfonic acid    Sultone of 4-hydroxy-1-butanesulfonic acid

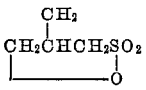 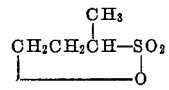

Sultone of 3-hydroxy-2-methyl-1-propanesulfonic acid    Sultone of 4-hydroxy-2-butanesulfonic acid Sultones are frequently alternatively described as alkanesultones. Thus, sultones suitable for use in the present process may be described as propanesultone, butanesultone, kerosenesultone, etc. The term butanesultone may then refer to any one or more of the above isomeric sultones.

Particularly preferred in the present process are sultones of the structure

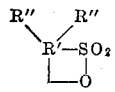

where R' is an alkyl hydrocarbon radical of from 3 to 7 carbon atoms and R" is selected from the class consisting of hydrogen and alkyl radicals containing from 1 to 12 carbon atoms. As examples of such sultones may be listed, e.g., the sultone of 5-ethyl-5-hexyl-3-hydroxy-1-undecanesulfonic acid, the sultone of 4-hydroxy-2-heptanesulfonic acid, the sultone of 2-butyl-3-hydroxy-1-octane-sulfonic acid, the sultone of 4-hydroxy-2,3-diethyl-1-pentanesulfonic acid, the sultone of 4-hydroxy-2-methyl-1-butanesulfonic acid, the sultone of 4-hydroxy-6-isopropyl-2-decanesulfonic acid, etc. Other suitable sultones may be listed, e.g., as propanesultone, butanesultone, hexanesultone, dodecanesultone, octadecanesultone, etc.

The phosphorothioic acid compounds of the above formula and suitable for use in the present process comprise the phosphorothiolic and phosphorothiolothionic acid esters and salts. In a preferred embodiment of the present process, the thiolic functional group which undergoes the present reaction is in the form of a mercaptide salt group, rather than a free mercaptan group, the salt being formed either prior to the present reaction, or in situ, by addition of a metallic salt-forming base to the reaction mixture containing the acidic thiolic compound. Such salt-forming bases may be, e.g., alkali metal and alkaline earth metal hydroxides, such as sodium hydroxide; or may be a basic salt of a light or heavy metal, such as barium carbonate.

One class of phosphorothiolic and phosphorothiolothionic acid compounds of the above formula and suitable for use in the present process comprise the said acids and salts thereof, e.g., sodium dihydrogen phosphorothiolate, potassium dihydrogen phosphorothiolothionate, potassium dihydrogen phosphorothiolate, cuprous dihydrogen phosphorothiolate, trisodium phosphorothiolate, tripotassium phosphorothiolothionate, calcium dihydrogen phosphorothiolate, barium sodium phosphorodithiolate, trilithium phosphorothiolothionate, trisodium phosphorotrithiolate, argentous dihydrogen phosphorotetrathioate, sodium dihydrogen phosphorothiolothionate, etc.

Another class of phosphorothiolic and phosphorothiolothionic acid compounds useful and particularly preferred for use in the present process comprises the ester salts of phosphorothioate acids, which may be represented by the formula

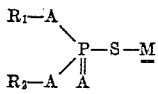

where A and $\underline{M}$ are as hereinbefore defined, $R_1$ is selected from the class consisting of the hydrogen atoms and ester-forming radicals, and $R_2$ is an ester-forming radical. With the esters, as with the phosphorothiolic and phosphorothiolothionic acids, as mentioned above, it is preferred to use the mercaptide salt, prepared beforehand or in situ, in the present reaction.

The phosphorothioates and the ester salts thereof are readily available materials, which may be obtained, for example, as described by Kosolapoff, "Organophosphorus Compounds" (New York, Wiley, 1950), p. 211 ff.

One class of phosphorothiolate and phosphorothiolothionate ester salts containing from 1 to 4 sulfur atoms and suitable for use in the present process comprises the alkyl esters of these phosphorothioic acids. These include, e.g., sodium O,O-dimethyl phosphorothiolate, nickel O,O-diethyl phosphorothiolothionate, lead O-methyl S-ethyl phosphorodithiolate, sodium O,S-diisopropyl phosphorodithiolothionate, potassium S,S-di-n-butyl phosphorotrithiolate, lithium didodecyl phosphorotetrathiolate, cuprous O-hexyl hydrogen phosphorothiolothionate.

Another class of esters of phosphorothioic acid salts useful in the present process comprises the alkenyl esters, e.g., sodium O,O-di-3-butenyl phosphorothiolothionate, potassium O-6-octenyl O-octyl phosphorothiolate, sodium bis(5-vinyldecyl) phosphorotetrathioate, sodium O,O-di-4-hexenyl phosphorothiolate, etc.

A further class of useful esters of phosphorothioic acid salts includes the cycloalkyl esters, e.g., sodium O,O-dicyclohexyl phosphorothiolothionate, sodium O,O-di-1-decahydronaphthyl phosphorothiolate, argentous O-cyclohexyl O-ethyl phosphorothiolothionate, mercurous O,O-dimethyl phosphorothiolate, etc.

Still another class of useful phosphorothioates comprises the aryl phosphorothiolate and phosphorothiolothionate salts, e.g., potassium O,O-diphenyl phosphorothiolate, sodium di-o-tolyl phosphorotetrathioate, magnesium O-phenyl O-2-naphthyl phosphorothiolothionate, zinc O,O-di-p-tolyl phosphorothiolate, etc.

Also useful in the present process are aralkyl esters of phosphorothioic acid salts, e.g., sodium benzyl phosphorotetrathioic acid, potassium O,O-bis(2-phenylpropyl) phosphorothiolate, sodium O,O-diphenethyl phosphorothiolothionate, lithium O,O-bis[2 - (2-naphthyl)ethyl] phosphorothiolate, etc.

It is to be noted that the ester-forming groups in the phosphorothioate ester salts of the types listed above are not limited to hydrocarbon radicals. Substituents which may be present on the ester-forming radical wtihout interfering with the course of the reaction include, e.g., halogen atoms, alkoxy radicals, carbalkoxy radicals, acyl radicals, cyano groups, etc.; ester radicals carrying mercapto substituents are not suitable, but hydroxy groups may be present on the ester-forming group of a phosphorothioate salt used in the present process without interference with the present reaction.

As examples of substituted phosphorothiolic and phosphorothiolothionic acid ester salts of the above formula and suitable for reaction with alkanesultones in accordance with the present invention may be listed, e.g., sodium O,O-bis(2-choloroethyl) phosphorothiolothionate, sodium bis(2-hydroxyethyl) phosphorotetrathioate, potassium S-2-carbethoxyethyl S-ethyl phosphorotrithiolate, calcium O,O-bis(4-methoxybutyl) phosphorothiolate, silver O,O-bis(p-methoxyphenyl) phosphorothiolate, sodium O,S-bis(6-acetyloctyl) phosphorodithiolothionate, stannous O,O-bis(2-cyanopropyl) phosphorothiolate, etc.

In accordance with present recommended nomenclature (Chemical & Engineering News (1952) 30, 4515), the products of reaction of alkanesultones and phosphorothiolic and phosphorothiolothionic acid salts and esters may be named as phosphinylthio- and phosphinothioylthioalkanesulfonates. Examples of the products of the present process are, e.g., sodium 3-(dihydroxyphosphinylthio)-1-propanesulfonate, sodium 4-(disodium dioxyphosphinylthio)-1-butanesulfonate, potassium 4-(dimercaptophosphinothioylthio)-1 - octanesulfonate, argentous 3-(dihydroxyphosphinothioylthio)-2-ethyl - 1 - dodecanesulfonate, sodium 3-(mercaptomethoxyphosphinylthio)-1-propanesulfonate, sodium 4-(calcium dioxyphosphinylthio)-2,2-dimethyl-1-butanesulfonate, sodium 3-(diethoxyphosphinylthio)-1-propanesulfonate, sodium 3 - [bis(2-ethylhexoxy)phosphinylthio] - 1 - butanesulfonate, potassium 4-[bis(2 - methoxyethoxy)phosphinothioylthio]-1-butanesulfonate, zinc 4-(diisooctoxyphosphinylthio)-1-dodecanesulfonate, calcium 4-[di(methylmercapto)phosphinylthio]-1-pentanesulfonate, silver 5-(di-n-butoxyphosphinylthio)-3-ethyl-1-pentanesulfonate, cuprous 3-[bis(2-cyanopropoxy)phosphinothioylthio] - 1 - propanesulfonate, sodium 3-[bis(2-chloroethoxy)phosphinylthio]-1-propanesulfonate, potassium 3-[(ethoxy)(methoxy)phosphinylthio]-1-propanesulfonate, sodium 4-[(methylmercapto)(butoxy)phosphinylthio] - 1 - butanesulfonate, sodium 3 - [bis(2-hydroxyethylmercapto)phosphinothioylthio]-5-ethyl-5-hexyl-1-undecanesulfonate, magnesium 3-(diphenethoxyphosphinylthio)-2-amyl - 1 - nonanesulfonate, potassium 4-[di(2-naphthylmercapto)phosphinothioylthio]-2,3-diethyl-1-pentanesulfonate, etc.

To prepare the present compounds, the alkanesultone is simply contacted with the phosphorothioic acid compound until reaction has occurred. Conveniently, equimolecular amounts of each reactant are used; if desired, however, an excess of one compound may be present, unreacted material being removed at the end of the reaction by distillation, extraction, etc. No catalyst is generally needed for the present reaction in its preferred embodiment, whereby alkanesultones are reacted with phosphorothiolate salts; if the phosphorothiolic acid compound contains a free mercaptan group, however, a metallic base should be present in the reaction mixture in an amount equivalent to the molar amount of phosphorothioic acid compound present. Examples of suitable bases are, e.g., an alkali metal hydroxide such as sodium hydroxide, a metal basic salt such as magnesium carbonate, etc. While the presence of a solvent or diluent is not necesasry, i.e., if one of the reactants is liquid at reaction temperature, the solvent may be omitted; we prefer to carry out the present process in solution, for ease of operation. The solvents or diluents used may be any convenient inert liquid, e.g., hydrocarbons, which may be aromatic, such as toluene, benzene, etc., aliphatic, such as pentane, hexane, etc., or cycloaliphatic, such as cyclohexane; other suitable solvents are oxygenated materials, i. e., alcohols, such as ethanol, isopropanol, or methoxypropanol, ethers such as dioxane, esters such as n-propyl acetate, ketones such as methyl ethyl ketone, etc.; or other inert solvents. We prefer to operate in the absence of water, but other inorganic solvents such as carbon disulfide, may be used if desired.

The present reaction goes readily at temperatures ranging from below room temperature up to below the decomposition temperatures of the reagents, depending on the nature of the alkanesultone and phosphorothiolate used. Generally, it may be convenient to heat the reaction mixture gently, at the reflux temperature, to facilitate reaction. Sub- or superatmospheric pressures may be applied if desired, e.g., to change the reflux temperature of a reaction mixture, but the reaction will go readily at ordinary atmospheric pressure. Time of reaction depends on the reaction conditions; from a few minutes to several hours may suffice. At the end of the reaction, solvents and unreacted material may be removed by distillation, extraction, etc., and the desired salt isolated.

The procedure for preparing phosphorothiolate esters and for reacting these with alkanesultones in accordance with the present invention is further illustrated by the following examples:

*Example 1*

To a solution of 39 grams (0.20 mole) of dibutyl phosphite in 200 ml. of dry toluene were added 4.6 grams (0.20 mole) of sodium metal, and the mixture was refluxed for an hour at about 100° C. A 100 ml. portion of the reaction mixture withdrawn from the undissolved residual sodium weighed 89.8 grams, and thus contained 0.0926 mole of sodium dibutyl phosphite. To this 100 ml. of solution were then added 3.0 grams (0.094 mole) of roll sulfur, and this mixture was refluxed for 40 minutes, giving a pale yellow homogeneous solution of sodium O,O-dibutyl phosphorothiolate.

The phosphorothiolate solution prepared as described above was mixed with 11.5 grams (0.094 mole) of γ-propanesultone in 25 ml. of benzene. In 25 minutes, the temperature of the mixture had risen spontaneously from 22° C. up to 30° C.; the reaction mixture was then refluxed gently for another hour. Subsequent removal of solvents left 38.6 grams of a thick, heavy, almost colorless syrup of water-soluble sodium 3-(dibutoxyphosphinylthio)-1-propanesulfonate, which analyzed as follows:

|  | Found | Calculated for $C_{11}H_{24}O_6PS_2Na$ |
|---|---|---|
| Percent C | 35.62 | 35.6 |
| Percent H | 6.62 | 6.53 |

*Example 2*

By refluxing 84 grams (0.20 mole) of bis(2-butyloctyl) phosphite with 5.1 grams (0.22 mole) of sodium metal in 201.5 grams of toluene for 3.5 hours, sodium bis(2-butyloctyl) phosphite was prepared. A 145 gram portion of the solution of this salt, prepared as described, was refluxed with 3.2 grams (0.10 mole) of roll sulfur for an hour, to yield sodium O,O-bis(2-butyloctyl) phosphorothiolate.

Immediately after its preparation, this solution of the phosphorothiolate, at a temperature of 70° C., was mixed with 12.2 grams of γ-propanesultone (dissolved in benzene). After the spontaneous temperature rise had stopped, the mixture was held at about 75° C. for 40 minutes, and then let cool. Solvents were removed under vacuum at 60° C.; then ethanol was added, again heating and vacuum applied, and finally more ethanol was added and the mixture was filtered. After distillation of the filtrate, there were obtained 54.8 grams of amber, viscous sodium 3-[bis(2-butyloctoxy)phosphinylthio]-1-propanesulfonate.

*Example 3*

To a solution of 5.6 grams (0.1 mole) of potassium hydroxide in 100 ml. of ethanol at 65–70° were added, drop by drop, 18.6 grams (0.1 mole) of O,O-diethyl phosphorothiolothionate. The solution of potassium O,O-diethyl phosphorothiolothionate thus formed was cooled to 40° C., and to this solution were added 12.2 grams (0.1 mole) of γ-propanesultone in 70 ml. of benzene. After the initial temperature rise, the solution was refluxed for an hour, after which heat and vacuum were applied to the reaction mixture to remove solvents. On addition of ethanol to the residue, there was obtained a slushy mixture, which was aspirated and then heated with 50 ml. of ethanol at 60° C., until the salt dissolved. The solution was let cool overnight and the precipitated salt was then filtered off, washed with ethanol and dried, leaving 26.6 grams of potassium 3-(diethoxyphosphinothioylthio)-1-propanesulfonate: white needles, which melt at 120–125° C. with sintering, and evolve gas at about 200° C. An additional 1.1 grams were recovered from the filtrate, giving a total yield of 87 percent of theoretical.

Similarly, by the reaction of sodium dihydrogen phosphorothiolate with δ-octanesultone, there is obtained sodium 4-(dihydroxyphosphinylthio)-1-octanesulfonate, etc.

It will be readily evident to those skilled in the art that, when two or more equivalent mercaptide salt groups are present in the phosphorothioic acid molecule, condensation products of 2 or more moles of sultone per mole of phosphorothioic acid compounds may be formed in addition to the equimolecular condensation products discussed above. For example, the condensation of trisodium phosphorodithiolate with propanesultone will produce sodium 3-(disodium oxythiophosphinylthio)-1-propanesulfonate, together with some disubstitution product of the formula

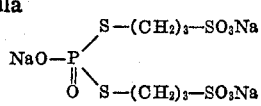

The product of equimolecular reaciton may be isolated, e.g., by recrystallization, or the reaction product may be used without separation into its components, if desired, for some purposes, such as application of the present reaction products as oil additives.

The phosphinothioalkanesulfonates prepared in accordance with the process of the present invention as described hereinabove are stable, well-defined compounds which range from viscous liquids to solid crystalline materials. The higher molecular weight material are particularly useful as surface-active agents, e.g., as detergents additives for lubricating oils; the low molecular weight salts are effective biological toxicants, e.g., insecticides, etc.; the compounds of high sulfur content may be used as rubber additives e.g., as vulcanization accelerators, etc.

The present phosphinothioalkanesulfonate salts are also useful chemical intermediates. For example, the sodium 3-(dibutoxyphosphinylthio)-1-propanesulfonate of Example 1 may be reacted with dimethyl sulfate, to convert it to the water-insoluble tertiary ester, methyl 3-(dibutoxyphosphinylthio)-1-propanesulfonate, which may be used, e.g., as a biological toxicant. By hydrolysis of the sulfonate group, the free 3-(dibutoxyphosphinylthio)-1-propanesulfonic acid may be formed, etc.

While the invention has been described above with reference to particular conditions and procedures, it will be understood that other modifications and equivalents within the scope of the invention will be obvious to those skilled in the art.

What is claimed is:

1. A compound of the formula

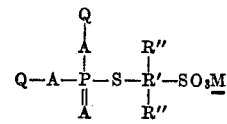

where Q is selected from the class consisting of hydrogen, alkali and alkaline earth metal cations and alkyl radicals having from 1 to 12 carbon atoms, A is a chalcogen element selected from the class consisting of oxygen and sulfur, R' is a saturated straight-chain hydrocarbon radical containing from 3 to 4 carbon atoms, R" is selected from the class consisting of hydrogen and lower alkyl radicals, and $\underline{M}$ is a metallic cation selected from the class consisting of alkali and alkaline earth metals.

2. A compound of the formula

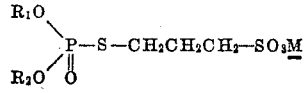

wherein $R_1$ and $R_2$ are alkyl radicals having from 1 to 12 carbon atoms and $\underline{M}$ is an alkali metal.

3. A compound of the formula

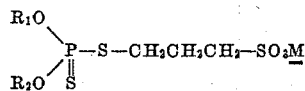

wherein $R_1$ and $R_2$ are alkyl radicals having from 1 to 12 carbon atoms and $\underline{M}$ is an alkali metal.

4. Sodium 3 - (dibutoxyphosphinylthio)-1-propanesulfonate.

5. Sodium 3 - [bis(2 - butyloctoxy)phosphinylthio]-1-propanesulfonate.

6. Potassium 3-(diethoxyphosphinothioylthio) - 1 - propanesulfonate.

7. The process which comprises reacting an alkane sultone of the formula

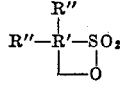

wherein R' is a saturated straight-chain hydrocarbon radical containing from 3 to 4 carbon atoms, and R" is selected from the class consisting of hydrogen and lower alkyl radicals, with a phosphorothioic acid salt of the formula

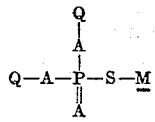

where Q is selected from the class consisting of hydrogen, alkali and alkaline earth metal cations and alkyl radicals having from 1 to 12 carbon atoms, A is a chalcogen element selected from the class consisting of oxygen and sulfur, and M is a metallic cation selected from the class consisting of alkali and alkaline earth metals, and isolating from the reaction product an addition product of the formula

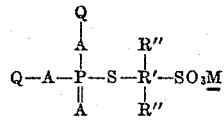

where Q, A, R', R" and $\underline{M}$ are as herein defined above.

8. The process which comprises reacting propane sultone with a compound of the formula

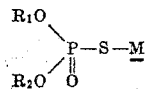

wherein $R_1$ and $R_2$ are alkyl radicals having from 1 to 12 carbon atoms and $\underline{M}$ is an alkali metal, and isolating from the resulting reaction product a compound of the formula

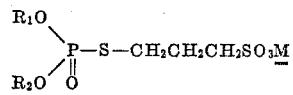

wherein $R_1$, $R_2$, and $\underline{M}$ are as herein defined above.

9. The process which comprises reacting propane sultone with a compound of the formula

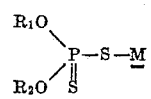

wherein $R_1$ and $R_2$ are alkyl radicals having from 1 to 12 carbon atoms and $\underline{M}$ is an alkali metal, and isolating from the resulting reaction product a compound of the formula

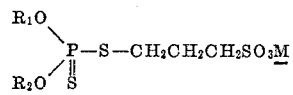

wherein $R_1$, $R_2$, and $\underline{M}$ are as herein defined above.

10. The process which comprises reacting γ-propanesultone with sodium O,O-dibutyl phosphorothiolate and isolating from the resulting reaction product sodium 3-(dibutoxyphosphinylthio)-1-propanesulfonate.

11. The process which comprises reacting γ-propanesultone with sodium O,O-bis(2-butyloctyl)phosphorothiolate and isolating from the resulting reaction product sodium 3-[bis(2-butyloctoxy)phosphinylthio]-1-propanesulfonate.

12. The process which comprises reacting γ-propanesultone with potassium O,O-diethyl phosphorothiolothionate and isolating from the resulting reaction product potassium 3 - (diethoxyphosphinothioylthio)-1-propanesulfonate.

References Cited in the file of this patent

UNITED STATES PATENTS

| 2,494,283 | Cassaday et al. | Jan. 10, 1950 |

FOREIGN PATENTS

| 452,508 | Great Britain | Aug. 24, 1936 |

OTHER REFERENCES

Chem. Abstracts, vol. 48, pp. 11480b, (abstracting German Patent No. 867,396, issued Feb. 16, 1953).